(No Model.)

C. S. BARBER.
DIVIDERS AND CALIPERS.

No. 313,275. Patented Mar. 3, 1885.

WITNESSES:
C. Neveux
C. Sedgwick

INVENTOR:
C. S. Barber
BY Munn & Co
ATTORNEYS.

UNITED STATES PATENT OFFICE.

CHARLES SUMNER BARBER, OF HARTFORD, CONNECTICUT.

DIVIDERS AND CALIPERS.

SPECIFICATION forming part of Letters Patent No. 313,275, dated March 3, 1885.

Application filed October 29, 1884. (No model.)

*To all whom it may concern:*

Be it known that I, CHARLES S. BARBER, of Hartford, in the county of Hartford and State of Connecticut, have invented new and Improved Dividers and Calipers, of which the following is a full, clear, and exact description.

The object of my invention is to provide certain new and useful improvements in dividers and calipers, whereby they can easily be adjusted from the inside and can be opened and closed very easily.

The invention consists in the combination, with a pair of dividers united by a spring, of a nut on each leg, a right and left screw passed through the nuts, and of a milled disk on the middle of the screw.

Reference is to be had to the accompanying drawings, forming part of this specification, in which similar letters of reference indicate corresponding parts in all the figures.

Figure 1:
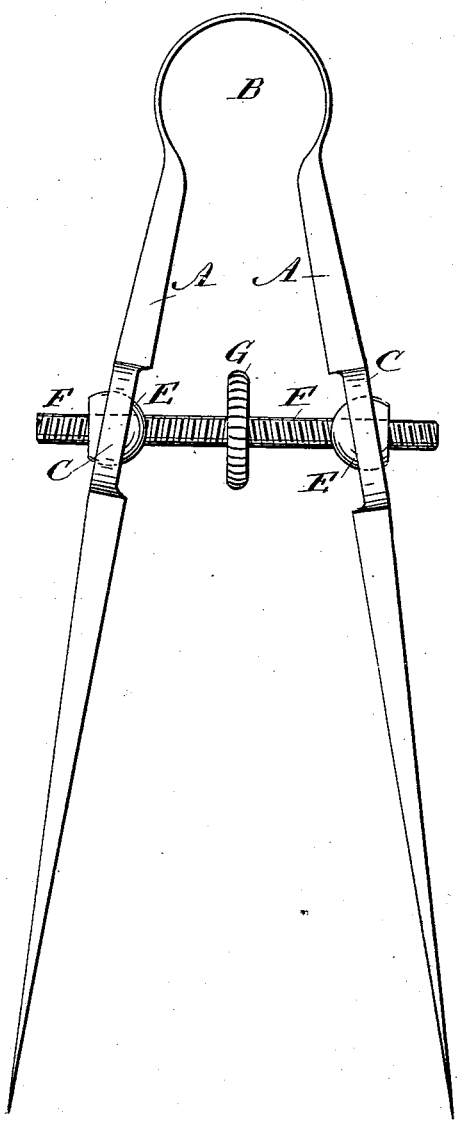
Figure 2:
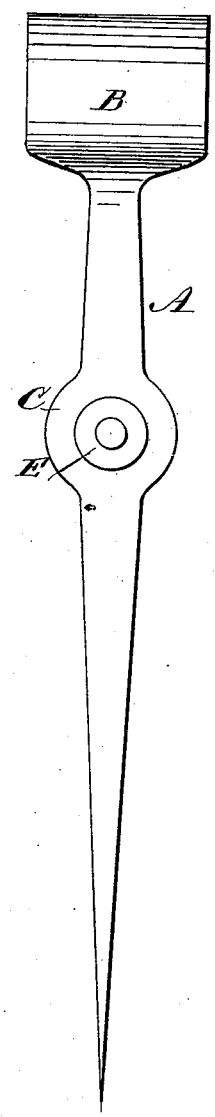
Figure 3:
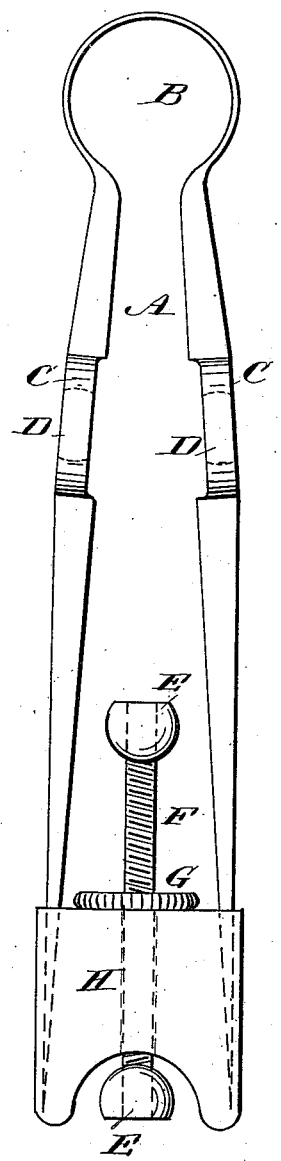
Figure 4:
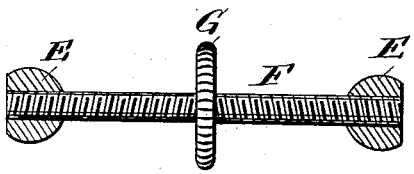

Figure 1 is a face view of my improved dividers and calipers opened. Fig. 2 is an edge view of the same. Fig. 3 is a face view showing them closed and folded. Fig. 4 is a longitudinal view of the screw and nuts, parts being in section.

The two divider or caliper legs, A, are united at the upper ends by a spring, B. Each leg is provided about one-third of its length from the upper end with a widened part, C, having a central circular aperture, D, the edges of which are made concave transversely.

In each aperture D a spherical nut, E, is placed from the outside, and in or through the said nuts the ends of a screw, F, are passed, which screw has right and left screw-threads on the opposite ends, and is provided with a milled disk, G, at the middle. The bow B presses the legs from each other, and this exerts sufficient outward pressure against the nuts to hold them in place by friction and prevent them from turning.

To move the legs toward or from each other, the legs A are grasped a short distance below the screw F, and the milled disk G is pressed on a table, &c., and trundled or rolled in one direction or the other, whereby the screw is turned and the legs separated or brought together. When the legs are separated such a distance that the spring B cannot press on the nuts E, the nuts are held by means of the fingers and the screw turned.

When the dividers are folded for transportation or when not in use, the screw F is screwed out of the nuts and withdrawn from the legs, the points of the legs are placed in a case, H, to protect them, and the nuts E are screwed on the ends of the screw, which is also placed in the case H and between the legs, as shown in Fig. 3.

Having thus described my invention, I claim as new and desire to secure by Letters Patent—

The dividers and calipers comprising the spring-connected legs or limbs having spherical nuts seated in concaved sockets formed in said limbs and the right and left hand threaded screw working in said nuts and provided with a fixed central disk having a milled surface, substantially as and for the purpose set forth.

CHARLES SUMNER BARBER.

Witnesses:
WILMOT THORNTON,
EDWIN T. CARTER.